United States Patent [19]
Tanahashi et al.

[11] 4,116,050
[45] Sep. 26, 1978

[54] PRESS LOAD METER
[75] Inventors: Sakae Tanahashi; Takashi Shima, both of Hiratsuka, Japan
[73] Assignee: Kabushiki Kaisha Komatsu Seisakusho, Japan
[21] Appl. No.: 837,589
[22] Filed: Sep. 28, 1977
[30] Foreign Application Priority Data
Sep. 30, 1976 [JP] Japan .................. 51-117717
[51] Int. Cl.² .............................................. G01B 7/16
[52] U.S. Cl. .................................. 73/88.5 R; 100/99
[58] Field of Search .................. 73/88.5 R; 100/99
[56] References Cited
U.S. PATENT DOCUMENTS

| 2,775,118 | 12/1956 | Legge et al. | 73/88.5 R |
| 2,800,790 | 7/1957 | Schover | 73/88.5 R |
| 2,924,968 | 2/1960 | Colten et al. | 73/88.5 R |
| 3,680,365 | 8/1972 | Summers | 73/88.5 R |
| 4,059,991 | 11/1977 | Dybel et al. | 73/88.5 R |

Primary Examiner—Charles A. Ruehl
Attorney, Agent, or Firm—Spensley, Horn & Lubitz

[57] ABSTRACT

A press load meter according to the present invention employs strain gauges as stress detectors. Outputs of the stress detectors are analogously processed until they are amplified and the amplified signals are digitally processed in a multiplexed form with respect to each channel whereby measurement in many stress detectors can be accomplished substantially simultaneously.

According to the invention, outputs of the respective stress detectors and a total sum thereof appearing before start of an operation cycle of the press are stored in a first memory as initial unbalance components with respect to each channel and a maximum load value during one operation cycle of the press is stored in a second memory with respect to each channel. Contents of the first memory are subtracted from contents of the second memory, the result of the subtraction being displayed with respect to each channel. By these arrangements, a true maximum value of a dynamic stress during a sliding operation of the press can be displayed without requiring a troublesome zero adjustment of the initial unbalance components which has been practiced in a conventional meter.

According to another embodiment of the invention, an overload signal is produced when a load applied to the stress detectors has exceeded a predetermined value.

6 Claims, 21 Drawing Figures

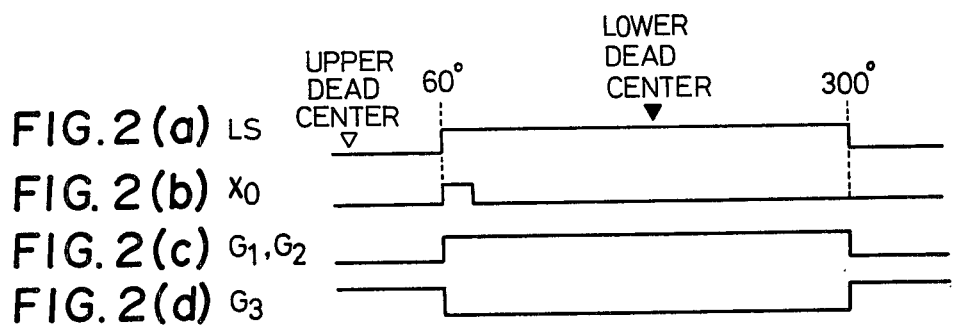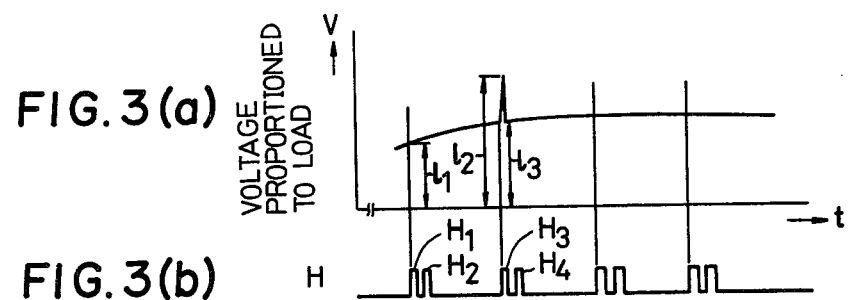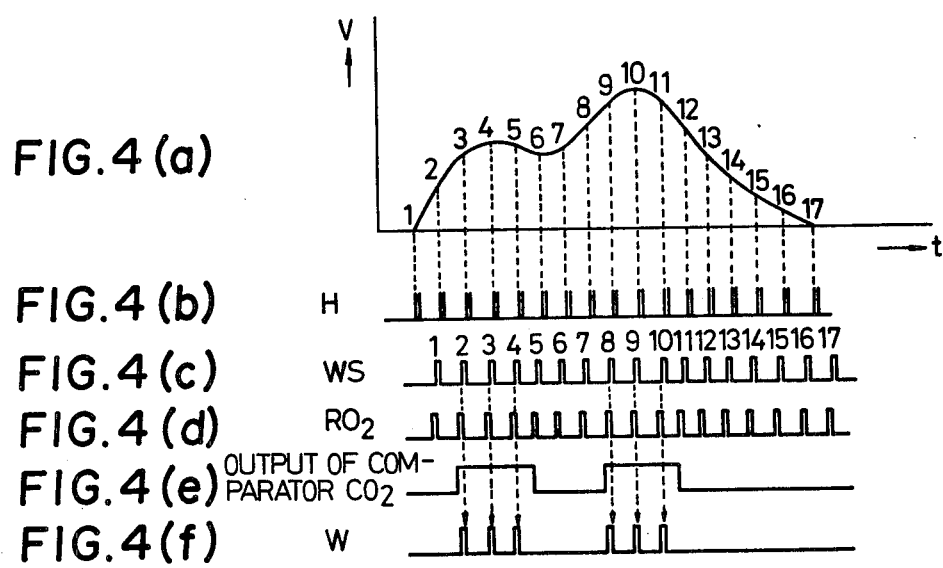

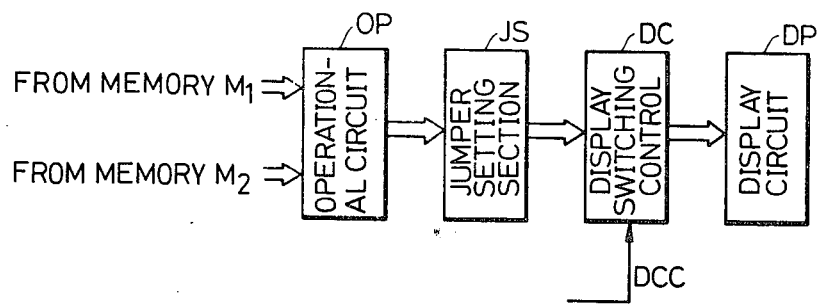
FIG.5
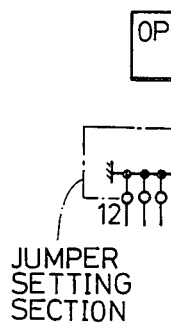
FIG.6(a)
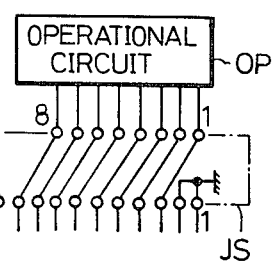
FIG.6(b)
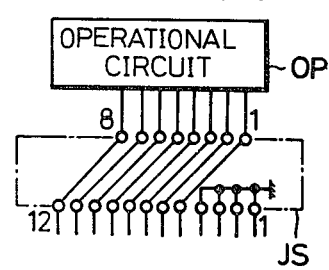
FIG.6(c)
FIG.7
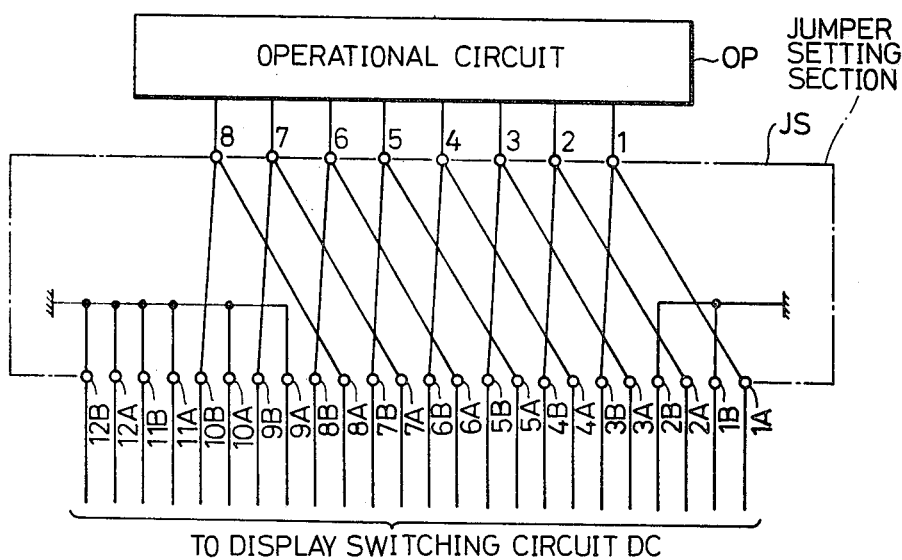

PRESS LOAD METER

BACKGROUND OF THE INVENTION

This invention relates to a press load meter which measures and displays the maximum value of dynamic stress caused during the operation of a press.

By the provision of a load meter on a press, the following various advantages can be obtained:

(1) The amount of feed can be controlled so that the load is most suitable with a metal mold set.

(2) Abnormal conditions such as engagement of foreign matters and wearing of a metal mold can be detected.

(3) Accordingly, the quality of work pieces can be controlled.

(4) Protection of the press can be suitably effected.

Therefore, one of the most important conditions for the load meter provided on a press is to readily measure a load value with high accuracy.

Furthermore, the following specific features are required for the press load meter:

(a) The maximum value of dynamic stress can be displayed for a relatively long period of time after the completion of a measurement.

(b) It can measure the load values at a plurality of points (two through four points) on the ram (slide) of the press as well as the sum of the load values.

(c) It has stability for a relatively long period and also simplicity in handling.

In a conventional press load measurement, when a press is operated to apply load to a work piece, strains are caused at various parts of the press by the load. The strains are proportional to the load. Therefore, strain gauges are provided at various measurement points, and Wheatstone bridges are provided for the measurement points, respectively. In addition, before starting the measurement, under the condition that no load is applied the unbalance outputs present in these Wheatstone bridges (hereinafter referred to as "initial values" when applicable) are zeroed by means of an initial balance controller. Thereafter, load is applied to the press, and the outputs of the Wheatstone bridges are measured with meters thereby obtaining the magnitudes of strains at the measurement points, namely, the magnitude of the load.

In this case, in the conventional device the initial unbalance control takes time and is troublesome because it is carried out manually for every measurement point; that is, the conventional device is poor in practical operation. Furthermore, in the conventional device, in the measurement of the maximum value of load a capacitor is charged with the output of the bridge circuit, and the voltage of the capacitor is displayed by a meter. In other words, the maximum value of load to be measured is held in an analog mode. Accordingly, the conventional device is disadvantageous in that the display value is decreased with time. In addition, the sum of the load values at the measurement points is obtained by switching the connections of the Wheatstone bridges, which leads to the disadvantage of the conventional device that the switching and connecting operations are rather troublesome.

Moreover, the conventional device is disadvantageous in that as it is provided with only one charge circuit and only one meter, it is impossible to simultaneously measure load values at all the measurement points (the load values at all the measurement points, and the sum thereof) for every one stroke of the press.

SUMMARY OF THE INVENTION

Accordingly, it is a primary object of this invention to eliminate all of the above-described difficulties accompanying a conventional press load meter. More specifically, a primary object of the invention is to provide a press load meter in which a substantial adjustment can be achieved by computation within a relatively short period of time, without conducting the adjustment of the conventional device, and in which it is possible to correctly measure and display the maximum load values at all of the measurement points and the maximum value of the load values totalized, the display being maintained unchanged.

Another object of the invention is to provide a press load meter in which, when noise components are contained in an electrical output of a strain gauge, the noise components are eliminated thereby to correctly measure and display the maximum load values at all of the measurement points and the maximum value of the load values totalized.

A further object of the invention is to provide a press load meter in which voltage representative of the sum of load values at measurement points is compressed so as to correspond to voltage levels at the measurement points so that a digital processing circuit is used commonly for the voltages of the measurement points and the voltage of the total value, and in digital display an initial total load value is displayed by shifting a total load value data, thereby to simplify the circuitry thereof.

A still further object of the invention is to provide a press load meter in which when load values at measurement points and the total load value exceed preset values, an overload signal is outputted, and a circuit for presetting the values is used commonly for load values at the measurement points and the total load value.

A specific object of the invention is to provide a press load meter in which a display switching circuit is provided so that the meter can be applied to a variety of presses different in performance and capability.

Provided according to this invention is a digital type press load meter in which initial unbalance components with respect to various points are digitized and stored, and after the completion of measurement, the maximum values at the points are subtracted by the respective initial values thereby to obtain the true maximum values, and in which during the measurement the strain outputs from all the points are switched sequentially in time-sharing manner and digitized so that the load values are stored in the memory address of the points thereby to measure the load values at all the points substantially at the same time in one stroke of the press, and in addition the maximum load value is digitized to be stored and read out to be displayed after the completion of the measurement, the display being maintained unchanged for a long period of time.

The fore going objects and other objects as well as the characteristic features of the present invention will become more apparent from the following detailed description and the appended claims when read in conjunction with the accompanying drawings, in which like parts are designated by like reference characters.

BRIEF DESCRIPTION OF THE DRAWINGS

FIGS. 2(a) through 2(d) are graphical diagrams showing the operation of a switch LS shown in FIG. 1 and various gate control signals;

FIGS. 3(a) and 3(b) are graphical diagrams showing the signals appearing in the component parts shown in FIG. 1 for explaining a function for preventing an erroneous operations by noise in a case where noise is included in a load wave signal with respect to one channel;

FIGS. 4(a) through 4(f) are graphical diagrams showing the signals appearing in the component parts shown in FIG. 1 for explaining the operation for storing a maximum load value in a memory $M_2$ in FIG. 1;

FIG. 5 is a block diagram showing a modified example of the load press meter of the invention;

FIGS. 6(a) through 6(c) are diagrams showing connections of the jumper setting section;

FIG. 7 is a diagram showing connections of the jumper setting section in a case where the adder TAD shown in FIG. 1 is so designed that it will produce an output which is one fourth of a sum of outputs of amplifiers $AM_1$ through $AM_n$;

DETAILED DESCRIPTION OF THE INVENTION

Figure 1:
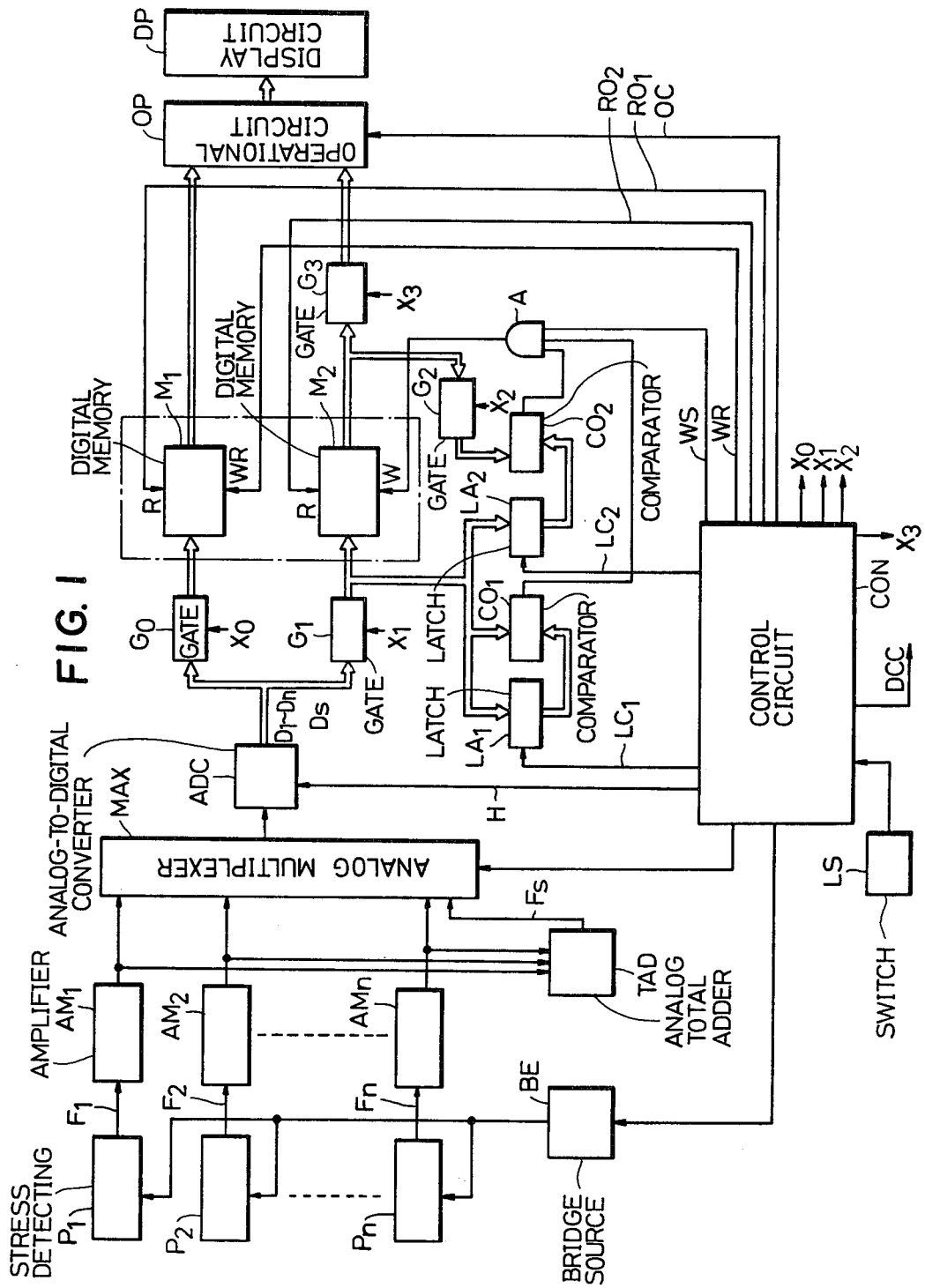
FIG. 1 is a block diagram showing an embodiment of the press load meter of the present invention applied to a single action type press.

Shown in FIG. 1 is one preferred example of a press load meter according to this invention applicable to a single action type press.

Referring to FIG. 1, stress detecting sections $P_1$ through $P_n$, each being made of a strain gauge, are adhered to predetermined portions of the ram or slide of a press. These strain gauges $P_1$ through $P_n$ are built in a wheatstone bridge. The strain gauges receive a signal, for instance a rectangular wave of 5 KHz, from a bridge source BE and convert it into electrical signals $F_1$ through $F_n$ corresponding to stress values, or load values, at the adhesion points thereof. The electrical signals $F_1$ through $F_n$ are amplified by respective amplifiers $AM_1$ through $AM_n$ and are thereafter introduced to an analog multiplexer MAX and an analog total adder TAD. The analog total adder TAD totalizes the signals $F_1$ through $F_n$ to apply a total load signal $F_S$ to the analog multiplexer MAX. The analog multiplexer MAX operates to arrange the signals $F_1$ through $F_n$ and the total load signal $F_S$ applied simultaneously thereto, in a time sharing manner, and to deliver them out. That is, the analog multiplexer MAX delivers out its output signals sequentially whenever a switching pulse signal is applied thereto from a control circuit CON. The output signals of the analog multiplexer MAX are applied to an analog-to-digital converter ADC which when a command signal H is applied thereto from the control circuit CON, converts its input analog signal into a digital signal which is outputted therefrom. Thus, the point signals $F_1$ through $F_n$ and the total signal $F_S$ are converted into digital signals $D_1$ through $D_n$ and $D_{n+1}$, respectively.

The analog multiplexer MAX is so designed that upon reception of the switching signal from the control circuit CON, it delivers out the point signals $F_1$ through $F_n$ and the total signal $F_S$ in the described order and in a time-sharing manner and outputs these signals cyclically until one operation cycle of the press is completed.

Hereinafter, signal series concerning the stress detecting sections $P_1$ through $P_n$ described below will be referred to as a first channel through an n-th channel, respectively, and a signal series concerning the total signal $F_S$ will be referred to as an $(n + 1)$th channel, when applicable.

A digital meory $M_1$ is to store unbalance components of the stress detecting sections $P_1$ through $P_n$ when no load is present, and digital signals $D_1^*$ through $D_{n+1}^*$ representative of the unbalance components are stored in the first through the $(n+1)$th channels of the memory $M_1$.

The output of the converter ADC is applied to a memory $M_2$ which, only when a newly applied digital signal is greater than the previously applied digital signal with respect to one and the same channel, rewrites its storage into the new digital signal. Accordingly, in one channel a digital signal corresponding to the maximum value out of the values which have been obtained is stored in the memory $M_2$ at all times.

The rewrite control of the memory $M_2$ is carried out by a latch circuit $LA_2$, a comparator $CO_2$ and a gate $G_2$. A latch circuit $LA_1$, and a comparator $CO_1$ serve to prevent the erroneous operation of the load meter according to the invention which otherwise may be caused by noise signals occuring in the outputs of the stress detecing sections and also in the lines connected thereto. Upon completion of one operation cycle of the press, the data having values corresponding to the maximum load values in the respective channels have been stored in the memory $M_2$. The data thus stored are read out and applied to one of the inputs of an operational circuit OP. On the other hand, data having values corresponding to the unbalance components (intial values) of the memory $M_1$ are read out and applied to the other input of the operational circuit OP.

In the operational circuit, for each channel the maximum load value is subtracted by the initial value, and the result is applied to a display circuit DP. Accordingly, the true maximum load value is displayed by the display circuit DP.

Storing of the initial value data in the memory $M_1$, storing of the measured values in the memory $M_2$, comparison of the maximum load, values, subtraction of the initial value from the maximum load value, and display of the subtraction result are all effected in synchronization with the operation of the body (slide) of the press. The position of the slide is obtained as an electrical signal by the on-off operation of a switch LS provided at a predetermined position in the vicinity of a rotary cam shaft which is normally mechanically coupled to the slide driving crank shaft.

During one stroke of the press, the slide at the top dead center moves downwards to the bottom dead center and then moves upwards to the top dead center, while the rotary cam shaft makes one revolution (360°).

It is assumed that a position corresponding to the top dead center of the rotary cam shaft is 0°. When the rotary cam shaft rotates through 60°, the switch LS is closed (ON) as shown in (a) of FIG. 2. As a result, a gate control signal $X_0$ as shown in (b) of FIG. 2 is produced by the control circuit CON to open the gate $G_0$. It goes without saying that in this case the stress detecting sections $P_1$ through $P_n$ are not subject to load, and the signals $F_1$ through $F_n$ from the stress detecting sections correspond to the unbalance components only.

Accordingly, the initial value data $D_1^*$ through $D_n^*$, and $D_s^*$ from the analog-to-digital converter ADC are applied to the memory $M_1$ through the gate $G_0$. A write signal WR from the control circuit CO operates so that relevant data are correctly written in the respective channels in the memory $M_1$. As the gate $G_0$ is closed in about 2 msec., thereafter the contents stored in the memory $M_1$ are maintained as they are.

As soon as the storage of the initial values starts, gates $G_1$ and $G_2$ are opened by gate control signals $X_1$ and $X_2$ produced by the control circuit. The open states of the gates are maintained unchanged until the rotary cam shaft rotates through 300°. During this period, a gate $G_3$ is kept closed because no gate control signal $X_3$ is applied thereto.

The analog-to-digital converter ADC is so designed as to subject the output signal of the multiplexer MAX to digital conversion twice per channel in a short period of time. Shown in a of FIG. 3 is a voltage waveform proportional to a load in one channel (for instance the first channel), and including noise. The voltage waveform is indicated enlarged in time. FIG. 3, b shows command signals, adjacent pulses $H_1$ and $H_2$, $H_3$ and $H_4$, . . . are very close in time to one another (although the time intervals between the pulses being shown enlarged). The values of the pulses $H_1$ and $H_2$ obtained through digital conversion are equal to each other.

First, data corresponding to a level $l_1$ digital-converted by the command signal $H_1$ is latched by the latch circuit $LA_1$ with the aid of a latch control signal $LC_1$. Then, data corresponding to the level $l_1$ digital-converted by the command signal $H_2$ is applied to the comparator $CO_1$ where it is compared with the latched data. In this case, as both of the data correspond to the level $l_1$, the output of the comparator $CO_1$ is "1." This ouput "1" means that no noise is included in the data.

Data digital-converted by the command signal $H_3$ contains a noise component, and therefore data corresponding to a level $l_2$ (the true value being $l_3$) is latched by the latch circuit $LA_1$. Then, data representative of the level $l_3$ subjected to digital-conversion with the aid of the command signal $H_4$ is applied to the comparator $CO_1$ where comparison is effected. In this case, undoubtedly both of the inputs are not coincident with each other, and therefore the output of the comparator $CO_1$ will be "0." This output "0" is to prohibit the writing in the memory $M_2$.

The output of the comparator $CO_1$ is applied to an input of an AND circuit A, and constitutes one condition for forming a write signal to the memory $M_2$. Accordingly, if a noise component is present, no data is written in the memory $M_2$.

Now, the maximum value detection function will be described with reference to the first channel only, assuming that no noise component is present.

Shown in (a) of FIG. 4 is an output waveform of the amplifier $AM_1$ concerning the first channel. Before measurement, the memory $M_2$ has been cleared, that is, the content of the memory $M_2$ is "0." The output waveform shown in FIG. 4 is subjected to digital-conversion by the command signals H at the points 1 through 17. At the point 1 the data is "0" and the content of the memory $M_2$ is maintained unchanged. Therefore, no detailed description will be made for this operation. At the point 2, the digital signal is applied through the gate $G_1$ to the latch circuit $LA_2$ with the aid of the command signal H, and is latched with the aid of a latch control signal $LC_2$ produced by the control circuit. Then, a read-out signal $RO_2$ from the control circuit CON is applied to the memory $M_2$, as a result of which the data stored in the memory $M_2$ is read out and applied through a gate $G_2$ to the comparator $CO_2$ where the data at the point 2 latched by the latch circuit $LA_2$ is compared with the data ("0" in the case) read out of the memory $M_2$. As, in this case, the data at the point 2 is greater, the comparator $CO_2$ provides an output "1." This output "1" is applied to an input of the AND circuit A. Therefore, when a write synchronization signal WS is applied from the control circuit CON to the AND circuit A, all of the inputs to the AND circuit A are "1," as a result of which its output, namely, a write signal W becomes "1." With this write signal W, the memory $M_2$ operates to write the data with respect to the point 2.

Thus, only when data greater than the data stored in the memory $M_2$ is applied through the gate $G_1$ to the memory $M_2$, the content stored in the memory $M_2$ is rewritten. Therefore, the content of the memory $M_2$ is rewritten with respect to the data of the points 2, 3, 4, 8, 9 and 10 in the stated order in the case of the waveform shown in FIG. 4, and finally the data of the point 10 is maintained stored in the memory $M_2$. That is, upon completion of one operation cycle of the press, the data corresponding to the maximum load value is stored in the memory $M_2$.

When the rotation angle of the rotary cam exceeds 300°, the gates $G_1$ and $G_2$ are closed, while the gate $G_3$ is opened. Then, the read-out signals $RO_1$ and $RO_2$ are applied from the control circuit CON to the memories $M_1$ and $M_2$, respectively, as a result of which the aforementioned initial value and the aforementioned maximum value are read out of the memories $M_1$ and $M_2$, respectively. Upon receiving an operation control signal OC from the control circuit CON, the operational circuit OP subtracts the initial value from the maximum value thereby to obtain the true maximum value which is introduced to and displayed by the display circuit DP.

If it is assumed that the output of the analog-to-digital converter ADC has eight bits, this digital output is 255 in full scale. Therefore, the highest measurement value is only 255 tons. However, there are many presses which have a capacity higher than 255 tons, for instance 500 tons and 1,000 tons. Accordingly, in order to allow the press load meter to be applicable to a variety of presses, a jumper setting section JS and a display switching control circuit DC are, according to the invention, inserted between the operational circuit OP and the display circuit DP as shown in FIG. 5.

If it is assumed that the output of the operational circuit OP has 8 bits, all that is necessary in this case is to connect the data of 8 bits in the jumper setting section JS so as to shift higher in bit. The following table indicates the relationships between the number of shift and the capacity of a press to be measured by the load meter:

Table

| Item | Number of Shift | Full-bit Display Value | Capacity of Press (ton) |
|---|---|---|---|
| I | 0 | 255 | 250 |
| II | 1 | 510 | 500 |
| III | 2 | 1020 | 1000 |

Table -continued

| Item | Number of Shift | Full-bit Display Value | Capacity of Press (ton) |
|---|---|---|---|
| IV | 3 | 2040 | 2000 |
| V | 4 | 4080 | 4000 |

Shown in a, b and c of FIG. 6 are diagrams theoretically illustrating jumper connection states for three different numbers of shifts 0, 2 and 4 in the jumper setting section JS.

On the other hand, in the adder TAD the sum of the outputs of the amplifiers $AM_1$ through $AM_n$ is multiplied by $1/n$ so that the result is approximately equal to each of the outputs of the amplifiers and can be expressed with 8 bits of the converter ADC. Accordingly, with respect to the total signal only, it is necessary to display the total signal multiplied by 4. For this purpose, the actual connection state in the jumper setting section JS is as shown in FIG. 7. In displaying the maximum load value concerning the detecting sections $P_1$ through $P_n$, the "A" side terminals of the jumper setting section JS are connected to the display circuit DP. In displaying the total signal, a switching signal DCC is applied from the control circuit CON to the display switching circuit DC so that the "B" side terminals of the jumper setting section JS are switched over to be connected to the display circuit DP. Thus, for the total signal, the maximum value which is a correct total value is displayed.

Figure 8:
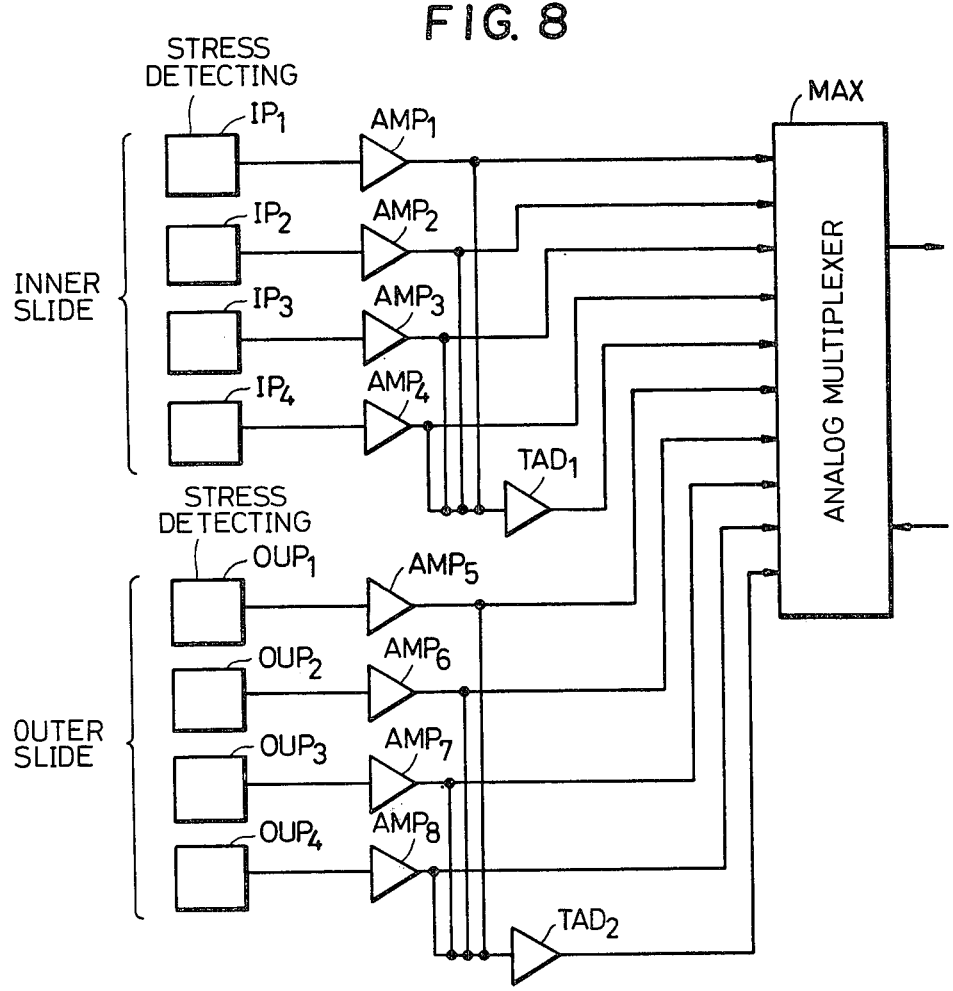
FIG. 8 is a block diagram showing another example of the press load meter of the invention applied to a double action type press.

FIG. 8 illustrates one example of the invention in which the press load meter is employed for a double action press. In this example, four stress detecting sections $IP_1$ through $IP_4$ are adhered to an inner slide, while four stress detecting sections $OUP_1$ through $OUP_4$ are adhered to an outer slide. Total adders $TAD_1$ and $TAD_2$ are provided for the inner slide and the outer slide, respectively. Amplifiers $AMP_1$ through $AMP_8$ are provided for the stress detecting sections, respectively.

Similarly as in the total adder aforementioned, each of the total adders $TAD_1$ and $TAD_2$ operates to output a ¼ of the sum of the outputs of the respective amplifiers.

In this example, the display of the maximum load concerning the inner points, the inner total, the outer points and the outer total must be carried out. In displaying the total value, it is necessary that data is shifted higher by 2 bits. Therefore, similarly as in the case described before, a jumper setting section JS in which jumper connection is arranged as shown in FIG. 9 can be employed.

Figure 9:
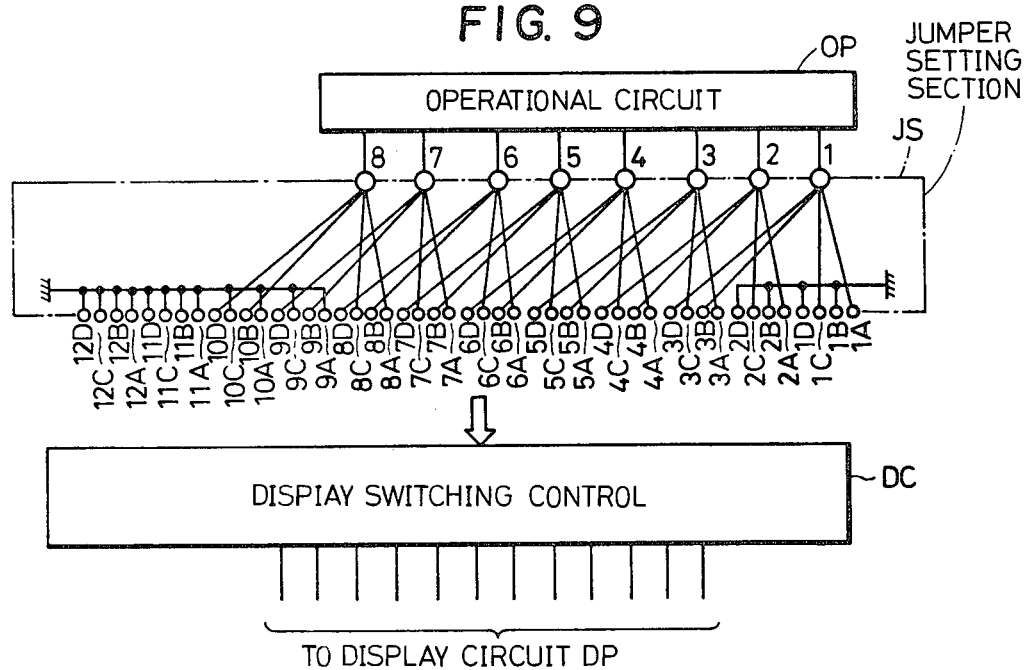
FIG. 9 is a diagram showing the jumper setting section employed for the example showing in FIG. 8.

In FIG. 9, the "A" side terminals, the "B" side terminals, the "C" side terminals, and the "D" side terminals are for the inner points, the inner total, the outer points, and the outer total, respectively. A display switching circuit DC, similarly as in the above-described case, carries out the switching and connecting with the aid of a display selecting signal applied thereto by the control circuit CON, and selectively delivers the maximum load value signals concerning the inner points, the inner total, the outer points, and the outer total.

If the press load meter is so designed that when the maximum load values concerning the points and totals exceed the respective set values, over-load signals are provided, it is possible to detect application of overloads in the press process. For instance if in a press of inner 4-points 800 tons (200 tons per point) and outer 4-points 400 tons (100 tons per point) its set overload value is 110%, then the set value for the inner points is 220 tons, the set value for the inner total is 880 tons, the set value for the outer points is 110 tons, and the set value for the outer total is 440 tons.

As is apparent from the above description, in obtaining the overload signals for the double action press, it is necessary to provide a circuit for setting the four set values and auxiliary circuits relating to the circuit, which leads to the provision of a considerably intricate circuitry.

However, according to this invention, such overload signals can be obtained by providing only two set values. More specifically, in the invention, with respect to the total each of the total adders $TAD_1$ and $TAD_2$ outputs a ¼ of its sum of the outputs of the respective amplifiers, and therefore the output data of the operational circuit OP can be considered to be equivalent to each of those concerning the points. That is, the same set value can be provided for the inner points and the inner total. More specifically, in the example aforementioned, the set value is 220 tons. The same thing can be applied to the case of the outer points and the outer total.

Figure 10:
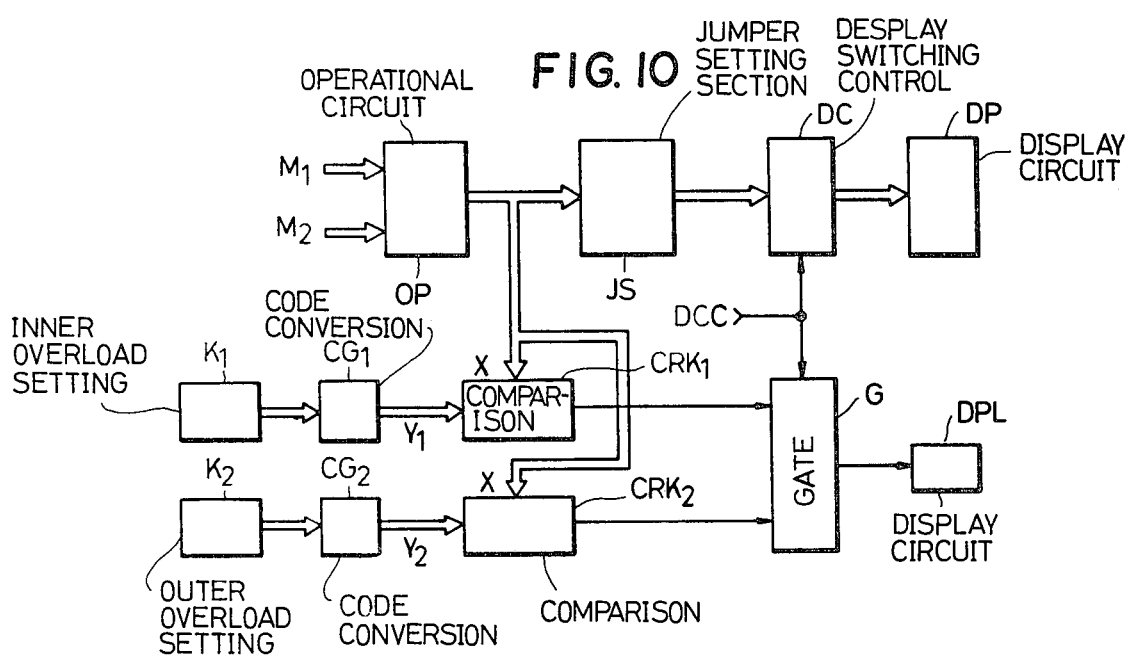
FIG. 10 is a block diagram showing still another example of the press load meter of the invention capable of producing also an overload signal.

In FIG. 10, an inner overload setting circuit $K_1$ is capable of suitably providing a set value as required. The output of the inner overload setting circuit $K_1$ is converted into an 8-bit digital signal $Y_1$ by a code conversion circuit $CG_1$ and is applied to one of the inputs of a comparison circuit $CRK_1$. On the other hand, an 8-bit data X representative of the maximum load value is applied from the operationa; circuit OP to the comparison circuit $CRK_1$ where the two data X and $Y_1$ are subjected to comparison. When the data X is greater than $Y_1$ ($X > Y_1$), the comparison circuit $CRK_1$ produces an output signal. Similarly, an outer overload setting circuit $K_2$, a code conversion circuit $CG_2$, and a comparison circuit $CRK_2$ are provided for the outer overload. The comparison circuit compares the data X with the data $Y_2$, and produces an output signal when the former is greater than the latter ($X > Y_2$).

The output signals of the comparison circuits $CRK_1$ and $CRK_2$ are applied to a gate circuit G. A display selection control signal DCC from the control circuit CON is applied to the gate G, and the gate G is opened with the timing of display in the aforementioned display circuit DP. Accordingly, if in this case the output signals of the comparison circuits $CRK_1$ and $CRK_2$ are available, these output signals are applied, as an overload signal, to a display circuit DPL through the gate G, thus indicating the occurrence of overload. The display circuit DPL may be a conventional one in which a light emission diode is operated, or a buzzer is operated by closing a relay switch built therein.

What is claimed is:
1. A press load meter comprising:
 a plurality of stress detecting sections provided at predetermined points of the ram or slide of a press and built in a bridge circuit;
 adder means for summing the outputs of said stress detecting sections in an analog mode;
 an analog multiplexer for repeatedly scanning the outputs of said adder means and stress detecting sections to arrange said outputs in time-sharing series;
 an analog-to-digital converter for converting the output of said analog multiplexer to digital signals;
 a first memory means for storing the outputs of said analog-to-digital converter which are representative of initial unbalance components of said stress detecting sections prior to start of one operation cycle of the press, i.e., when no load is applied to said press;

a second memory means which operates to rewrite its storage content only when the output of said analog-to-digital converter is greater than said content during the application of load;

a control means for controlling the rewriting operation of said second memory means;

a digital operational circuit for subtracting the content stored in said first memory means from the content stored in said second memory means upon completion of one operation cycle of said press; and a display means for displaying the output of said operational circuit.

2. A press load meter as claimed in claim 1, in which said control means for controlling the rewriting operation of said second memory means comprises: a latch circuit means for latching the outputs of said analog-to-digital converter separately according to signals at the points, and the total thereof; and a comparison circuit means which operates to compare data latched by said latch circuit means with data stored in said second memory means and to produce a rewrite signal only when said latched data is greater than said data stored in said second memory means.

3. A press load meter as claimed in claim 2, in which said analog-to-digital converter carries out digital conversion twice in a relatively short period of time separately according to the signals at the points and the total thereof, further comprising a latch circuit for latching the output of said first digital conversion, and a comparison circuit means which operates to compare the output of said first digital conversion with the output of said second digital convertion and to produce a signal for prohibiting said rewrite signal only when the former output is not coincident with the latter output.

4. A press load meter as claimed in claim 1, in which said adder means operates to sum up the outputs of said stress detecting sections and to output a fraction of the sum, and at the rear stage of said operational circuit is provided a jumper setting section for shifting the output data of said operational circuit higher in bit only in a total display.

5. A press load meter as claimed in claim 1, in which said plurality of stress detecting sections are provided on an inner slide and on an outer slide, and said adder means comprises an adder for said inner slide which is adapted to sum the outputs of said stress detecting sections concerning inner points, and an adder for said outer slide which is adapted to sum the outputs of said stress detecting sections concerning outer points.

6. A press load meter as claimed in claim 5, in which a setting circuit means for setting an overload value, and a comparison circuit means which compares the overload value with the output of said operational circuit and produces an overload signal when the output of said operational circuit exceeds the overload value are provided for each of said inner slide and outer slide, and in which a display circuit means for informing the occurrence of overload with the aid of said overload signal is further provided.

* * * * *